(12) United States Patent
Nakata

(10) Patent No.: US 6,779,354 B2
(45) Date of Patent: Aug. 24, 2004

(54) TEMPERATURE CONTROL DEVICE OF LIQUID COOLING DEVICE

(75) Inventor: Tetsuo Nakata, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 30 days.

(21) Appl. No.: 10/149,394

(22) PCT Filed: Dec. 14, 2000

(86) PCT No.: PCT/JP00/08880
§ 371 (c)(1),
(2), (4) Date: Jun. 11, 2002

(87) PCT Pub. No.: WO01/44662
PCT Pub. Date: Jun. 21, 2001

(65) Prior Publication Data
US 2003/0079485 A1 May 1, 2003

(30) Foreign Application Priority Data
Dec. 14, 1999 (JP) .......................................... 11/354133

(51) Int. Cl.$^7$ .............................................. F25D 17/02
(52) U.S. Cl. ............................. 62/185; 62/180; 62/201; 62/228.4
(58) Field of Search .................... 62/185, 180, 201, 62/228.1, 228.4, 228.5, 434, 435

(56) References Cited

U.S. PATENT DOCUMENTS 4,197,712 A * 4/1980 Zwick et al. ................. 62/50.3

5,040,379 A  8/1991 Fukunaga et al.

FOREIGN PATENT DOCUMENTS

| JP | 61-134700 | 8/1986 |
| JP | 1-212870 | 8/1989 |
| JP | 2-104994 | 4/1990 |
| JP | 03-050387 | 3/1991 |
| JP | 8-145479 | 6/1996 |
| JP | 9-119746 | 5/1997 |

* cited by examiner

Primary Examiner—Harry B. Tanner
(74) Attorney, Agent, or Firm—Nixon Peabody LLP; Donald R. Studebaker

(57) ABSTRACT

In an oil conditioner comprising: a coolant oil circulation circuit (8) through which a coolant oil of a machine tool (1) is circulated by an oil pump (12); a refrigeration circuit (20) formed by interconnecting, in the order given, a compressor (15), a condenser (16), a pressure reducing mechanism (17), and an evaporator (18) for cooling the coolant oil in the coolant oil circulation circuit (8) by heat exchange with refrigerant; and an inverter (28) for controlling the operating frequency of a motor (14) of the compressor (15), the output from the inverter (28) is switched to a motor (11) of the oil pump (12) during the time the compressor (15) is out of operation so that the amount of coolant oil that the oil pump (12) circulates is made variable, and the amount of coolant oil that the oil pump (12) circulates is reduced when the amount of heat produced in the operation of the machine tool (1) decreases because, for example, the machine tool (1) is stopped, for reducing wasteful consumption of energy by the oil pump (12). Energy savings are achieved through the oil pump (12).

4 Claims, 10 Drawing Sheets

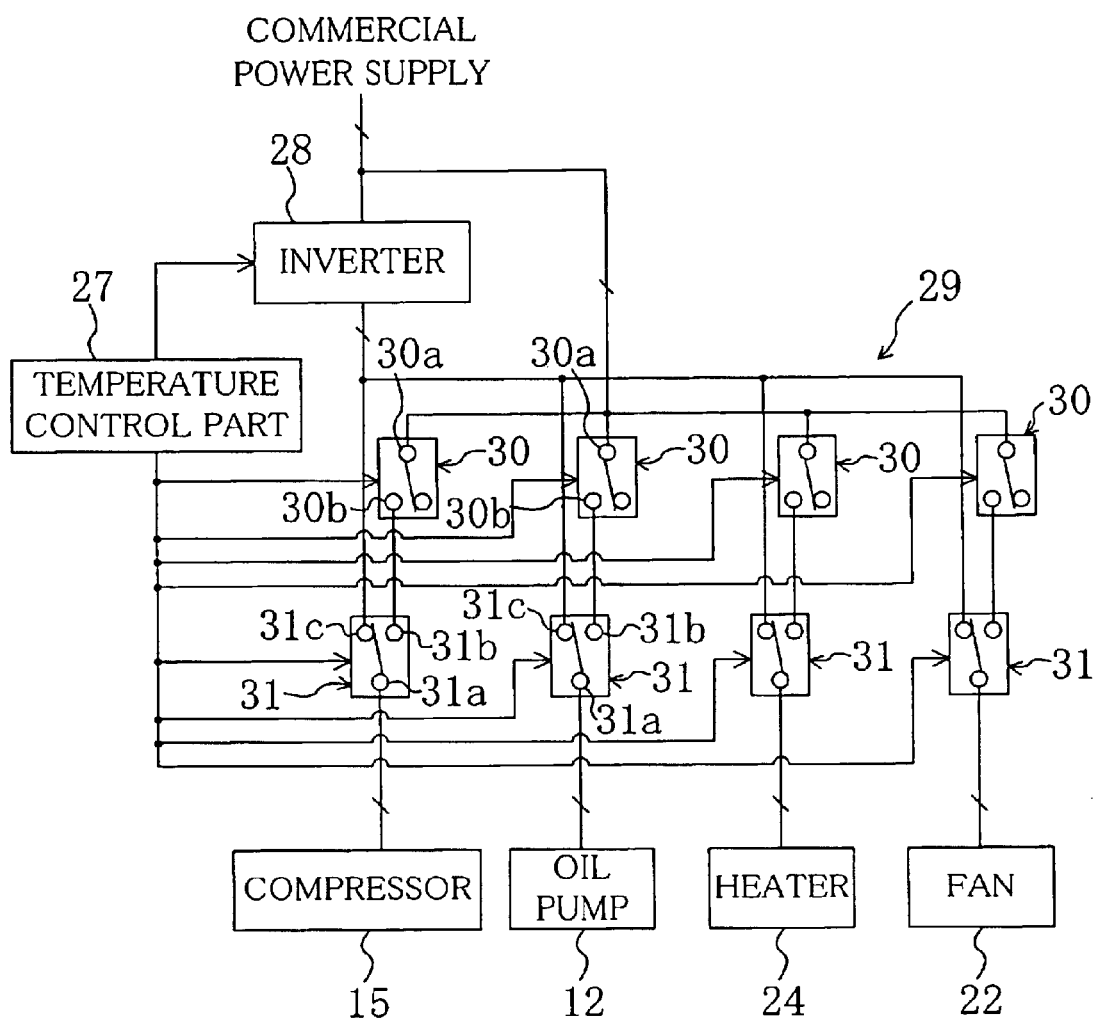

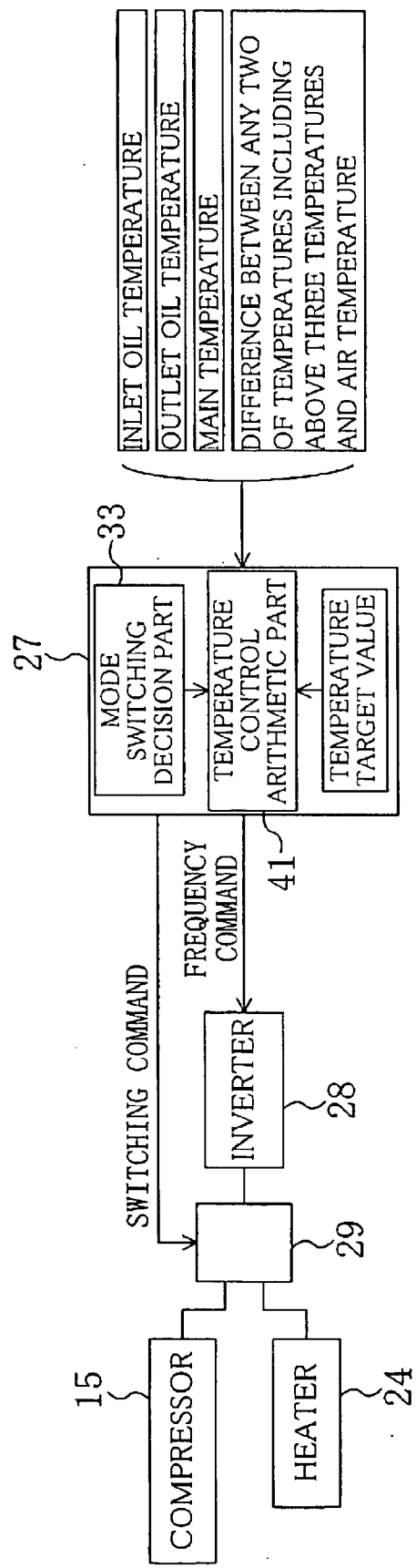

TEMPERATURE CONTROL DEVICE OF LIQUID COOLING DEVICE

TECHNICAL FIELD

The present invention relates to a temperature controller for a liquid cooling system for holding, by making utilization of a refrigeration circuit, the temperature of a coolant liquid for use in devices such as a machine tool at a substantially constant value and more particularly it relates to energy-saving technology thereof.

BACKGROUND ART

Conventionally, liquid cooling systems adapted to cool a coolant liquid of a device such as a machine tool by circulation thereof have been known in the art. One such liquid cooling system is disclosed in Japanese Patent Kokai Gazette No. H02-104994. The disclosed liquid cooling system comprises: a coolant liquid circulation circuit through which the device coolant liquid is circulated by a motor-driven circulation pump; and a refrigeration circuit formed by interconnecting, in the order given, a compressor, a condenser, a pressure reducing mechanism, and an evaporator. The coolant liquid is cooled by making utilization of the evaporation of liquid refrigerant in the evaporator, and the compressor is subjected to variable displacement control by an inverter so that the temperature of the coolant liquid is held at a substantially constant value even when there occurs a change in heat generation accompanied with the operation of the device.

Apart from the above, such previously known liquid cooling systems employ a circulation pump for the circulation of a device coolant liquid. The circulation pump is a rated flow rate type and therefore discharges coolant liquid at a fixed rate, and the rated flow rate is so set as to secure a sufficient cooling capacity or the like even when the device operates at its maximum capacity. And the circulation pump is in operation all the time. In other words, the circulation pump is continuously operated and discharges a fixed amount of coolant liquid, even when it is not required doing so. That is, there are operation situations in which it is sufficient for the circulation pump to deliver a minimum amount of coolant liquid required for lubrication or the like, when the amount of heat generated in the operation of the device decreases (for example, when the device is out of operation) and there is no need for the circulation pump to deliver cooled coolant liquid to the device at a rated flow rate. The circulation pump consumes energy unnecessarily, and there is room for improvement.

Further, when the compressor stops operating at the time of controlling the temperature of the coolant liquid, the inverter also becomes idle. Therefore, it is desirable that the inverter be utilized effectively.

Bearing in mind the above, the present invention was made. Accordingly, a first object of the present invention is to reduce unnecessary energy consumption by a circulation pump by providing improvements in the manner of controlling the circulation pump in a liquid cooling system comprising a coolant liquid circulation circuit through which a device coolant liquid is circulated as described above, and a refrigeration circuit through which refrigerant is circulated.

Further, a second object of the present invention is to effectively utilize an inverter which controls the operating frequency of a compressor of a liquid cooling system of the same type as described above, by providing improvements in the manner of controlling the inverter.

DISCLOSURE OF THE INVENTION

In order to achieve the first object described above, the amount of coolant liquid that a circulation pump circulates is made variable depending on the operating state or operating environmental state of a machine in the present invention.

More specifically, as shown in FIGS. 4, 6, 9, and 10, the present invention presupposes a liquid cooling system, the liquid cooling system comprising a coolant liquid circulation circuit (8) in which a coolant liquid of a machine (1) is circulated by a circulation pump (12) which is operated by a motor (11), and a refrigeration circuit (20) formed by interconnecting, in the order given, a compressor (15), operated by a motor (14), for compressing gas refrigerant, a condenser (16) for condensing gas refrigerant, a pressure reducing mechanism (17) for depressurizing liquid refrigerant, and an evaporator (18) for cooling the coolant liquid in the coolant liquid circulation circuit (8) by heat exchange with refrigerant.

And, a coolant liquid circulation amount control means (27) is provided which varies, on the basis of an operating state or operating environmental state of the machine (1), the amount of coolant liquid that the circulation pump (12) circulates.

As a result of such arrangement, the circulation pump (12) is operated by the motor (11), thereby causing a coolant liquid for the machine (1) to circulate through the coolant liquid circulation circuit (8), and the device coolant liquid is cooled, midway along the coolant liquid circulation circuit (8), by heat exchange with refrigerant in the evaporator (18) of the refrigeration circuit (20). Then the amount of circulating coolant liquid in the coolant liquid circulation circuit (8) is changed by the coolant liquid circulation amount control means (27) depending on the operating state or operating environmental state of the machine (1). Because of this, when the machine tool (1) enters for example the out-of-operating state and, as a result, the amount of heat produced in the operation of the machine tool (1) is reduced (i.e., when there is no need to deliver to the machine tool (1) cooled coolant oil at a rated flow rate and it is sufficient that a minimum required amount of coolant oil for lubrication or the like is delivered to the machine tool (1)), it is arranged such that the amount of coolant liquid that the circulation pump (12) circulates is reduced. This reduces wasteful consumption of energy by the circulation pump (12) and energy savings are achieved.

Further, as shown in FIG. 10, it may be arranged such that the circulation pump (12) is a variable displacement pump capable of variable discharge of coolant liquid, and that the coolant liquid circulation amount control means (27) varies the rate of flow by controlling the discharge amount of the variable displacement pump.

Such arrangement makes it possible to vary the rate of flow of coolant liquid by controlling the amount of coolant liquid that the variable displacement pump discharges, and the coolant liquid circulation amount control means (27) can be embodied easily.

Further, it may be arranged such that a pole change means is provided which changes the number of poles of the motor (11) of the circulation pump (12), and that the coolant liquid circulation amount control means (27) varies the rate of flow by controlling the number of poles of the motor (11) through the pole change means.

If the pole change means performs control so that the number of poles of the motor (11) of the circulation pump

(12) is reduced, then it is possible to reduce the amount of coolant liquid that the circulation pump (12) circulates, and the coolant liquid circulation amount control means (27) can be embodied.

As shown in FIGS. 4 and 9, it may be arranged such that an inverter (28, 28P) is provided which changes the operating frequency of the motor (11) of the circulation pump (12), and that the coolant liquid circulation amount control means (27) varies the rate of flow by controlling the operating frequency of the motor (11) through the inverter (28, 28P).

If the inverter (28, 28P) performs control so that the operating frequency of the motor (11) is reduced, then it is possible to reduce the amount of coolant liquid that the circulation pump (12) circulates, and the coolant liquid circulation amount control means (27) can be embodied.

Further, as shown in FIG. 4, it may be arranged such that the inverter (28) controls the operating frequency of the motor (14) of the compressor (15), and that a switching means (33) is provided which switches, according to an operating state or operating environmental state of the machine (1), the destination, to which an output from the inverter (28) is directed, between the motor (14) of the compressor (15) and the motor (11) of the circulation pump (12).

In accordance with such arrangement, the destination, to which the output from the inverter (28) is directed, is switched between the motor (14) of the compressor (15) and the motor (11) of the circulation pump (12) according to the operating state or operating environmental state of the machine (1) by the switching means (33), and for example during normal operation the output of the inverter (28) is fed to the motor (14) of the compressor (15) and the motor (11) of the circulation pump (12) is connected to a normal power supply. On the other hand, when reducing the amount of circulating coolant liquid because, for example, the machine (1) is out of operation, the output of the inverter (28) is switched to the motor (11) of the circulation pump (12) from the motor (14) of the compressor (15). As a result, the operation of the compressor (15) is stopped and the operation of the circulation pump (12) is controlled by the inverter (28). As described above, the single inverter (28) is switchably connected to the compressor (15) or to the circulation pump (12), thereby making it possible to effectively utilize the idle inverter (28) when the compressor (15) stops operating, for the operation of the oil pump (12). In comparison with such a case that outputs from two inverters are connected to the compressor (15) and to the oil pump (12), respectively, it is possible to cut costs by reducing the number of inverters (28) required. Further, it is possible to reduce power loss for inverter efficiency when the circulation pump (12) is operated in normal mode by the output of the inverter (28).

Further, it may be arranged such that the coolant liquid circulation amount control means (27) has, as the operating mode of the circulation pump (12), a rated flow rate mode in which the rate of flow of the coolant liquid is fixed and a variable flow rate mode in which the rate of flow of the coolant liquid varies, and is so configured as to allow the circulation pump (12) to switch between the flow rate modes according to an operating state or operating environmental state of the machine (1).

As a result of such arrangement, the operating mode is switched between the rated flow rate mode and the variable flow rate mode according to the operating state or operating environmental state of the machine (1). For example, during normal operation the rated flow rate mode is selected, whereby the rate of flow of coolant liquid is held constant, while, for example when the machine (1) enters the out-of-operation state, the variable flow rate mode is selected, whereby the rate of flow of coolant liquid is made variable. Accordingly, it is possible to easily change the operation mode of the circulation pump (12).

In order to achieve the second object described above, the present invention presupposes a liquid cooling system comprising: a coolant liquid circulation circuit (8) in which a coolant liquid of a machine (1) is circulated by a circulation pump (12) which is operated by a motor (11); a refrigeration circuit (20) formed by interconnecting, in the order given, a compressor (15), operated by a motor (14), for compressing gas refrigerant, a condenser (16) for condensing gas refrigerant, a pressure reducing mechanism (17) for depressurizing liquid refrigerant, and an evaporator (18) for cooling the coolant liquid in the coolant liquid circulation circuit (8) by heat exchange with refrigerant; and an inverter (28) for controlling the operating frequency of the motor (14) of the compressor (15), wherein a switching means (33) is provided which switches the destination, to which an output from the inverter (28) is directed, between the motor (14) of the compressor (15) and any other electric operating means according to an operating state or operating environmental state of the machine (1).

As a result of such arrangement, the destination, to which the output from the inverter (28) is directed, is switched between the motor (14) of the compressor (15) and another electric operating means according to the operating state or operating environmental state of the machine (1) by the switching means (33). For example, when the compressor (15) is in operation, the output from the inverter (28) is connected to the compressor (15) so that the operating frequency of the compressor (15) is controlled in variable manner. On the other hand, when the compressor (15) is stopped, the output from the inverter (28) is connected to the electric operating means so that the frequency of a power supply to the electric operating means is controlled in variable manner. Because of this, the output from the inverter (28) is always connected to either one of the compressor (15) and the electric operating means, which makes it possible to effectively and continuously utilize the inverter (28) without stopping the operation of the inverter (28).

Preferably, the electric operating means is any one of the motor (11) of the circulation pump (12), an electric heating means (24) for electrically heating the coolant liquid circulating in the coolant liquid circulation circuit (8), and an electric air blowing means (22) for sending air to the condenser (16).

As a result of such arrangement, the electric operating means can be embodied. Especially, if it is arranged such that the electric heating means (24) is controlled by the inverter (28), this makes it possible to provide enhanced temperature control performance for coolant liquid.

It may be arranged such that the operating state or operating environmental state of the machine (1) includes at least one of a signal sent from the side of the machine (1), a liquid temperature of the coolant liquid, an operating temperature of the machine (1), and an environmental temperature of the machine (1). This arrangement makes it possible to embody examples of the operating temperature or operating environmental temperature of the machine (1).

The machine (1) is a machine tool or industrial machine using oil as a coolant liquid. As a result, the machine (1)

becomes a desirable device capable of effectively providing the effects of the present invention.

BRIEF DESCRIPTION OF THE DRAWINGS

FIG. 5 is an electric circuit diagram schematically showing an inverter switching circuit.

FIG. 7 is a corresponding diagram to FIG. 6 showing an arrangement of the temperature control part in the control unit when switching the inverter output destination between the compressor and the heater.

BEST MODE FOR CARRYING OUT THE INVENTION

Best modes for carrying out the present invention will be described as exemplary embodiments in conjunction with the Figures.

Embodiment 1

Figure 4:
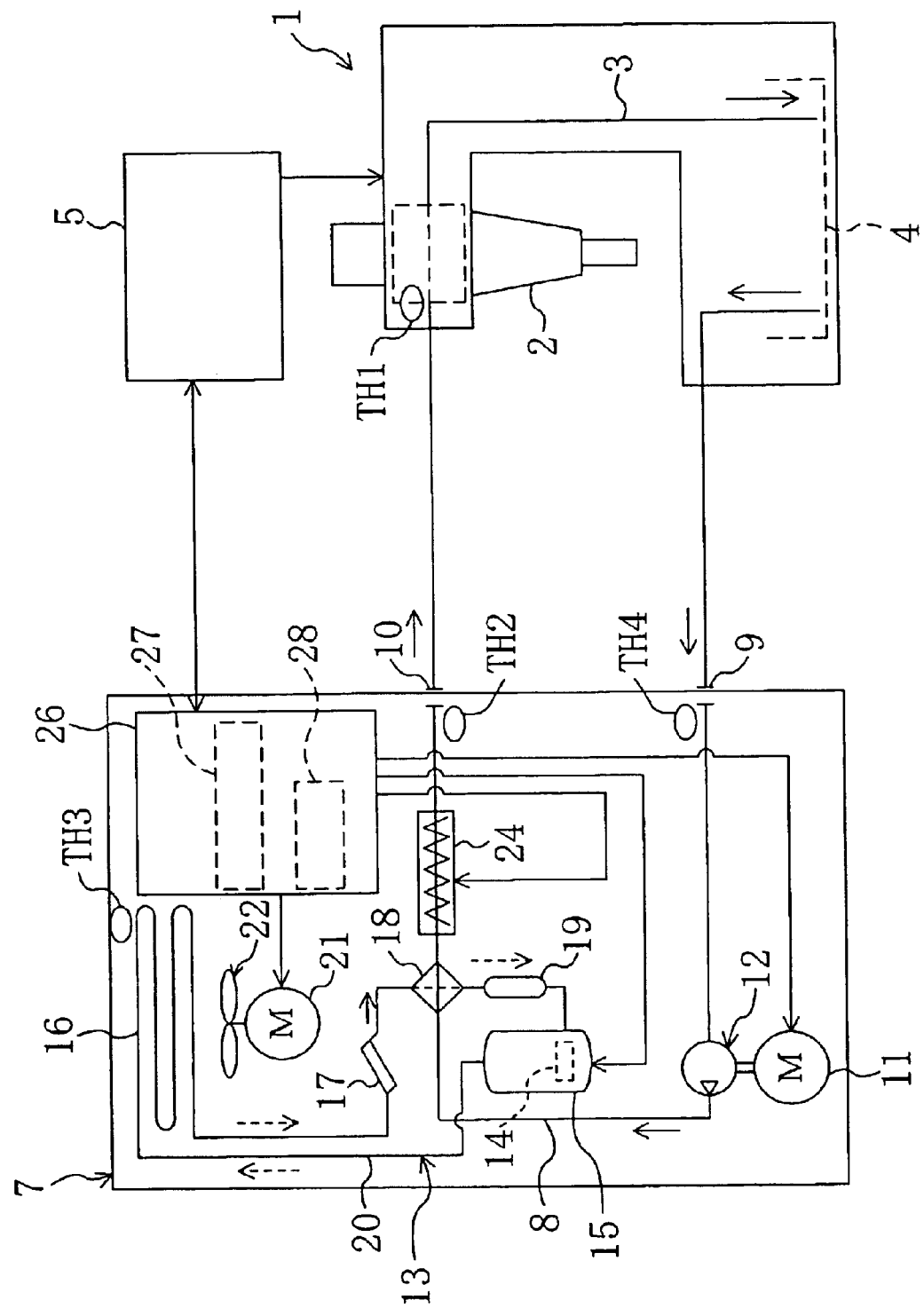
FIG. 4 shows an entire arrangement of the first exemplary embodiment of the present invention.

Referring first to FIG. 4, there is shown an entire arrangement of a first exemplary embodiment of the present invention. Reference numeral (1) represents a machine tool, e.g., a machining center as a device for performing specified machining on a workpiece (not shown). The machine tool (1) comprises a main spindle part (2) having an end to which a cutter (not shown) such as a milling bit and a drill bit is attached, oil piping (3) through which coolant oil (coolant liquid) flows so that thermal load resulting from machining or the like is absorbed and the temperature of the main spindle part (2) is held at a constant value, a reservoir (4) in which to store the coolant oil, and a main control unit (5) by which the operation of the machine tool (1) is controlled.

Reference numeral (7) represents an oil conditioner serving as a liquid cooling system for cooling coolant oil of the machine tool (1). The oil conditioner (7) is provided with a coolant oil circulation circuit (8) for coolant oil circulation. An upstream end of the coolant oil circulation circuit (8) is connected in series to the reservoir (4) of the machine tool (1) via an inlet port (9), whereas a downstream end of the coolant oil circulation circuit (8) is connected in series to an upstream end of the oil piping (3) via an outlet port (10). Disposed in the coolant oil circulation circuit (8) is an oil pump (12) serving as a circulation pump which is rotationally driven by a pump motor (11) implemented by an electric motor so that the coolant oil is forcefully circulated. By virtue of the oil pump (12), the coolant oil, which has returned to the inside of the reservoir (4) from the main spindle part (2) by way of the oil piping (3), is drawn by the oil pump (12) so that it is caused to flow into the coolant oil circulation circuit (8) via the inlet port (9) of the oil conditioner (7). The coolant oil discharged from the oil pump (12) is circulated so that it is supplied again to the main spindle part (2) from the coolant oil circulation circuit (8) via the outlet port (10).

The oil conditioner (7) includes a cooling device (13) for cooling the coolant oil, and an electric heater (24) serving as a heating means for heating the coolant oil. The cooling device (13) has a refrigeration circuit (20) formed by interconnecting, in the order given, a compressor (15) which is driven by a compressor motor (14) implemented by an electric motor and which compresses gas refrigerant, a condenser (16) which cools the discharged gas refrigerant from the compressor (15) to condense and liquefy it, a capillary tube (17) serving as a pressure reducing mechanism for reducing the pressure of the liquid refrigerant from the condenser (16), an evaporator (18) by which the liquid refrigerant pressure-reduced by the capillary tube (17) is caused to evaporate, and an accumulator (19) for gas-liquid separation of the refrigerant which is being returned from the evaporator (18) to the compressor (15). The condenser (16) is provided with an electric fan (22) serving as an electric air blower means which is driven by a fan motor (21) implemented by an electric motor and which blows air to the condenser (16), and in the evaporator (18) coolant oil in the coolant oil circulation circuit (8) is cooled by heat exchange with the refrigerant.

Further, the electric heater (24) is disposed in a portion of the coolant oil circulation circuit (8) between a corresponding portion of the refrigeration circuit (20) to the evaporator (18) and the outlet port (10). For example, coolant oil which is delivered from the oil conditioner (7) from the machine tool (1) at the time of starting the machine tool (1) is heated for warm-up of the machine tool (1).

The oil conditioner (7) contains therein a control unit (26) for controlling the motor (14) of the compressor (15), the motor (11) of the oil pump (12), the electric heater (24), and the motor (21) of the electric fan (22). The control unit (26) is connected to the main control unit (5) in such a way that signals can be communicated therebetween. Further, as will be described later (see FIG. 6), the control unit (26) is fed: a detection signal from a main temperature thermistor (TH1) for detection of a temperature of the main spindle part (2) of the machine tool (1) (i.e., an operating temperature of the machine tool (1)), an outlet oil temperature thermistor (TH2) for detection of a temperature of the coolant oil in the vicinity of the outlet port (10) of the coolant oil circulation circuit (8); a detection signal from an air temperature thermistor (TH3) for detection of an atmospheric temperature of the inside of the oil conditioner (7); and a detection signal from an inlet oil temperature thermistor (TH4) for detection of a temperature of the coolant oil in the vicinity of the inlet port (9) of the coolant oil circulation circuit (8). The outlet oil temperature thermistor (TH2) may be disposed in the vicinity of an upstream end of the oil piping (3) in the main machine (1) for detection of a temperature of the coolant oil which leaves the main spindle part (2) and flows through the oil piping (3).

The control unit (26) is equipped with a temperature control part (27) for coolant oil temperature control and an inverter (28) capable of changing the frequency of power supply. The temperature control part (27) constitutes a coolant liquid circulation amount control means by which the amount of circulating coolant oil is made variable on the basis of: the combination of mode selecting ON and OFF signals from the main control unit (5) (which will be described later); the mode selection instruction signal; or the output signal of each of the thermistors (TH1)–(TH4) as an operating state or operating environmental state of the machine tool (1).

And, the destination, to which the output from the inverter (28) is directed, is alternatively switched to any one of the motor (11) of the oil pump (12), the motor (14) of the compressor (15), the motor (21) of the electric fan (22), and the electric heater (24) by an inverter switching circuit (29). As shown in FIG. 5, the switching circuit (29) comprises pairs of relays (30) of a first type and relays (31) of a second type provided for the compressor (15), the oil pump (12), the heater (24), and the fan (22), respectively. Movable contacts (30a) of the first type relays (30) are connected to the commercial power supply, whereas ON contacts (30b) of the first type relays (30) are connected to first contacts (31b) of the second type relays (31), respectively. On the other hand, second contacts (31c) of the second type relays (31) are connected to the inverter (28), whereas movable contacts (31a) of the second type relays (31) are connected to the compressor (15), to the oil pump (12), to the heater (24), and to the fan (22), respectively. These eight relays (the four first type relays (30) and the four second type relays (31)) are switch controlled by the temperature control part (27) so that the output of the inverter (28) is alternatively connected to any one of the devices (i.e., the motor (11) of the oil pump (12), the motor (14) of the compressor (15), the motor (21) of the electric fan (22), and the electric heater (24) and the remaining three devices are connected to the commercial power supply. For example, with respect to the first and second type relays (30) and (31) associated with the compressor (15), when the movable contact (31a) of the second type relay (31) is switched to the second contact (31c) and the movable contact (30a) of the first type relay (30) is switched to the ON contact (30b), the output of the inverter (28) is connected to the compressor (15) for controlling the operating frequency of the compressor motor (14) while on the other hand the remaining object devices (i.e., the oil pump (12), the electric fan (22), and the electric heater (24)) are brought into connection with the commercial power supply so that they are operated by the commercial power supply.

Figure 6A:
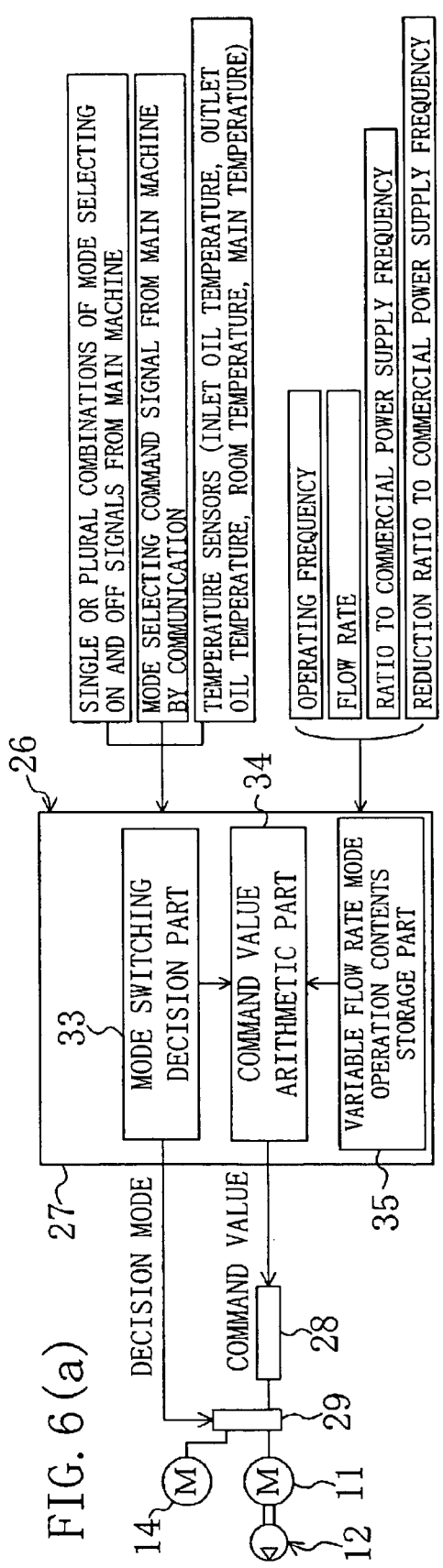
FIGS. 6(a) and 6(b) are diagrams showing arrangements of a temperature control part in a control unit of an oil conditioner.

As shown in FIG. 6(a), the temperature control part (27) of the control unit (26) includes: a mode switching decision part (33) (switching means) for switching the operating mode of the oil pump (12) between a rated flow rate mode in which the oil pump (12) is operated at a rated flow rate so that the coolant oil flow rate is constant, and a variable flow rate mode in which the oil pump (12) is operated at a variable flow rate so that the coolant oil flow rate is variable; a command value arithmetic part (34) for performing arithmetic on the frequency or velocity command of the pump motor (11) for the inverter (28) when the operating mode of the oil pump (12) is switched to the variable flow rate mode by the mode switching decision part (33); and a variable flow rate mode operation contents storage part (35) for storing variable flow rate mode operation contents such as an operation frequency, coolant oil flow rate, operating frequency to commercial power supply frequency ratio (i.e., the ratio with respect to the commercial power supply frequency), operation frequency to commercial power supply frequency reduction ratio (i.e., the reduction ratio to the commercial power supply frequency), for the pump motor (11) of the oil pump (12).

The mode switching decision part (33) has a plurality of mode selecting signal input ports (not shown) through which plural combinations of ON and OFF signals from the main control unit (5) for selecting an operating mode of the oil pump (12) are input as an external signal. And the mode switching decision part (33) selects an operating mode of the oil pump (12) by referring these plural input port signal combinations to its internal table prestored. For example, in the case the mode switching decision part (33) has two mode selecting signal input ports, it decides a flow rate mode depending on the combination of ON and OFF signals applied at these two input ports (see the Table shown below). The Table shows variable flow rate modes 1–3 that differ from each other in coolant oil flow rate.

TABLE

| MODE SELECTING SIGNALS | | |
|---|---|---|
| PORT 1 | PORT 2 | MODES |
| OFF | OFF | RATED FLOW RATE MODE |
| OFF | ON | VARIABLE FLOW RATE MODE 1 |
| ON | OFF | VARIABLE FLOW RATE MODE 2 |
| ON | ON | VARIABLE FLOW RATE MODE 3 |

Further, as the external signal that is to be input to the mode switching decision part (33), other than the aforementioned plural ON-to-OFF signal combinations sent from the main control unit (5), mode selecting command signals sent from the main control unit (5) by communication and output signals from the temperature thermistors (TH1)–(TH4) may be employed.

Figure 6B:
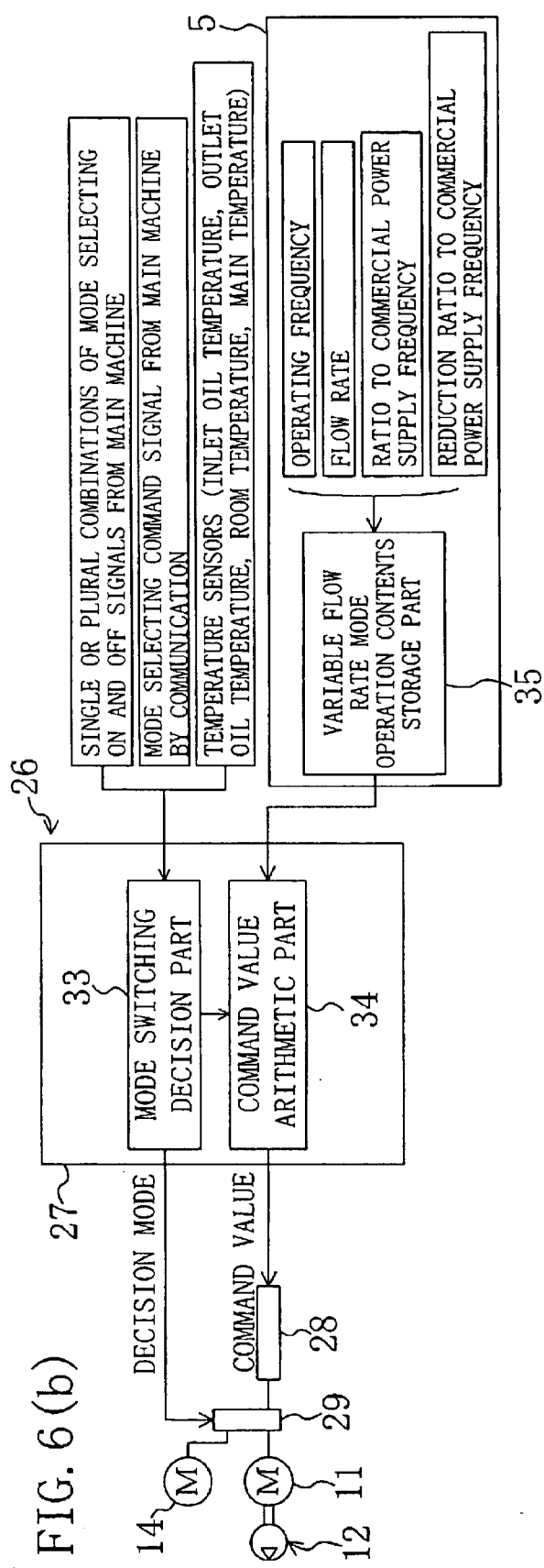

Further, it is possible to make a change as shown in FIG. 6(b). That is, the variable flow rate mode operation contents storage part (35) is provided not in the temperature control part (27) of the control unit (26) but in the main control unit (5), wherein the variable flow rate mode operation contents storage part (35) of the main control unit (5) delivers to the command value arithmetic part (34) of the temperature control part (27) of the control unit (26) signals about the operation frequency, coolant oil flow rate ratio to the commercial power supply frequency, reduction ratio to the commercial power supply frequency of the pump motor (11) of the oil pump (12) by communication.

Figure 1:
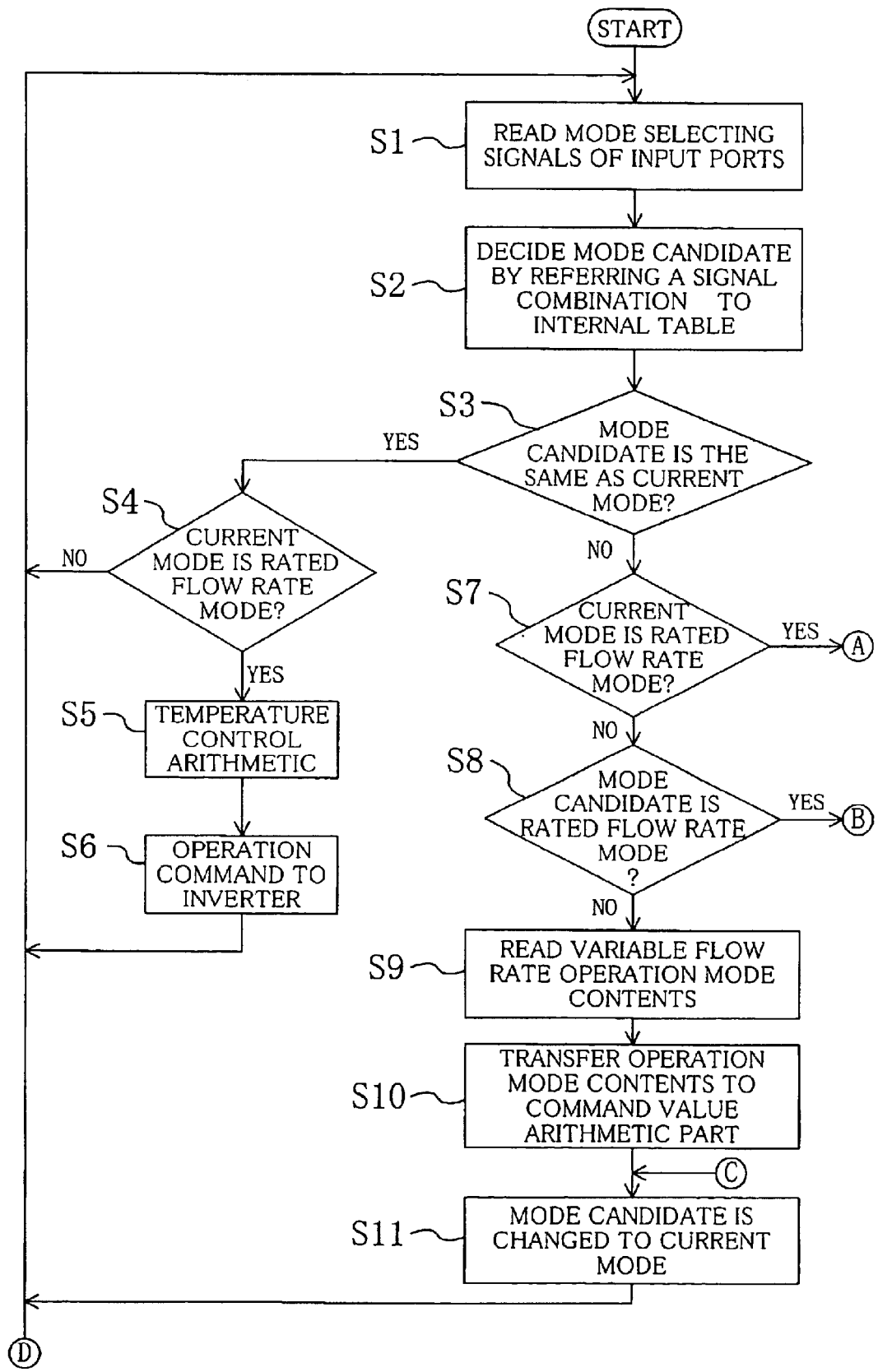
FIG. 1 is a flow chart diagram showing a first half of a signal processing operation which is performed to switch the destination, to which the output from the inverter is directed, between a compressor and a circulation pump in a control unit of a first exemplary embodiment of the present invention.
Figure 2:
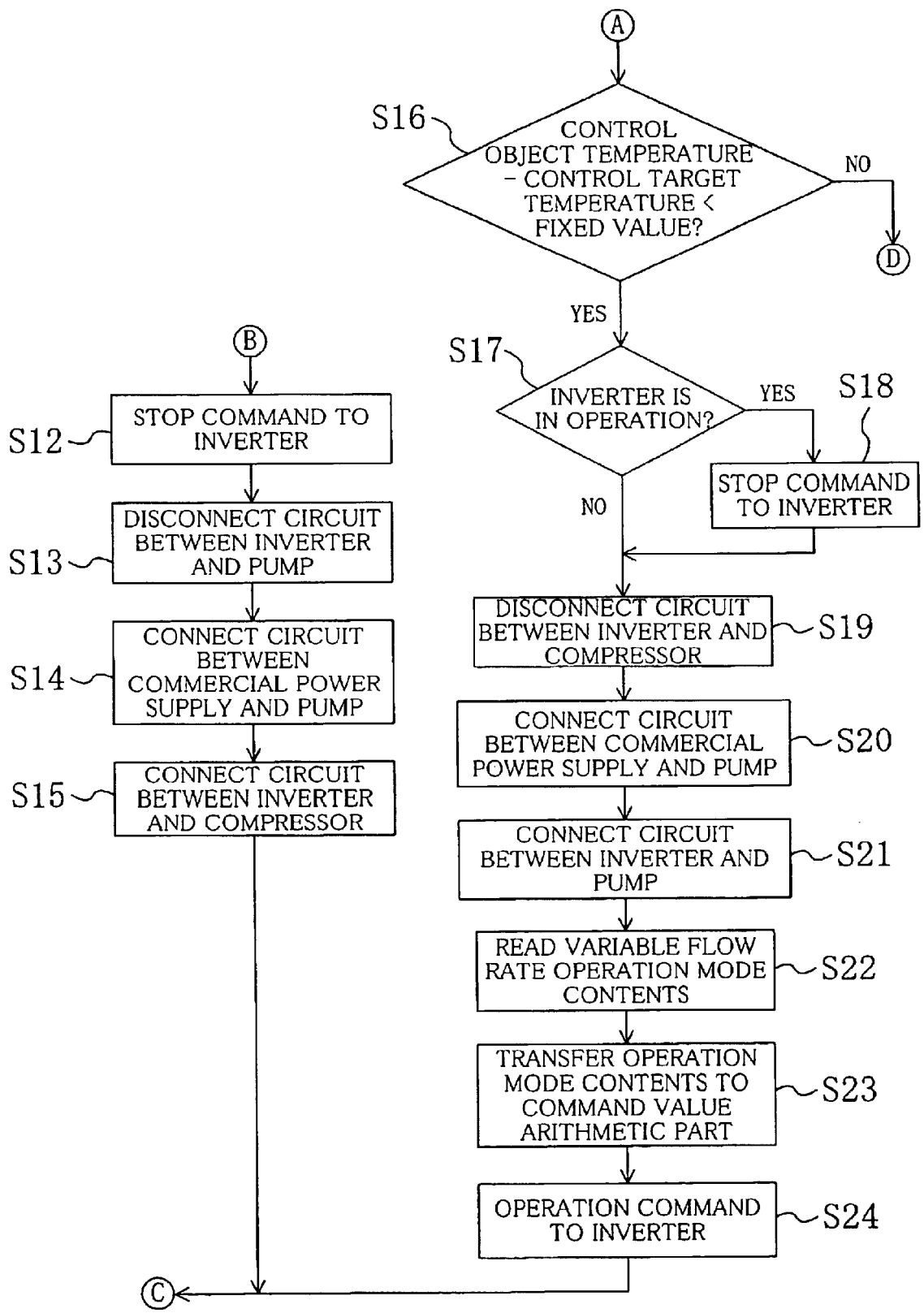
FIG. 2 is a flow chart diagram showing a second half of the signal processing operation.

Referring now to FIGS. 1 and 2, a signal processing operation for performing switching the destination, to which the output from the inverter (28) is directed, between the compressor motor (14) of the compressor (15) and the pump motor (11) of the oil pump (12) in the control unit (26) will be described below. In STEP S1 of FIG. 1, respective signals at the mode selecting signal input ports of the temperature control part (27) are read as an external signal. Next, in STEP S2, a combination of the signals obtained is referred to the internal table for determining an operating mode candidate (see the Table).

In STEP S3 it is decided whether the operating mode candidate determined in STEP S2 is the same as the current operating mode, and if the decision is YES, then the signal processing operation proceeds to STEP S4. In STEP S4 it is decided whether the current operating mode is a rated flow rate mode. If the decision is NO, the signal processing operation returns straight to STEP S1. On the other hand, if the decision is YES, then the signal processing operation proceeds to STEP S5, and oil coolant temperature control arithmetic is performed. Next, in STEP S6 an operation command is issued to the inverter (28) and thereafter the signal processing operation returns to STEP S1.

On the other hand, if STEP S3 makes a decision of NO, then it is decided in STEP S7 whether the current operating mode is a rated flow rate mode. If the decision is NO, then the signal processing operation proceeds to STEP S8. In STEP S8 it is decided whether the operation mode candidate decided in STEP S3 is a rated flow rate mode. If the decision is NO, then the signal processing operation proceeds to STEP S9, and contents of a variable flow rate stored in the variable flow rate mode operation contents storage part (35) is read. Then, in STEP S10 the contents thus read are transferred to the command value arithmetic part (34). In STEP S11, the operation mode candidate is changed to the current operation mode. Thereafter, the signal processing operation returns to STEP S1.

Further, if STEP S8 makes a decision of YES, then a stop command is issued to the inverter (28) in STEP S12. In STEP S13 the circuit between the inverter (28) and the oil pump (12) is disconnected by switching of the second type relay (31) of the switching circuit 29 associated with the oil pump (12). In STEP S14 the circuit between the commercial power supply and the oil pump (12) is connected by switching of the first type relay (30) associated with the oil pump (12). In STEP S15 the circuit between the inverter (28) and the compressor (15) is connected by switching of the second type relay (31) associated with the compressor (15). Thereafter, the signal processing operation proceeds to STEP S11.

On the other hand, if STEP S7 makes a decision of YES, the signal processing operation proceeds to STEP S16. In STEP S16 it is decided whether the difference between a control object temperature and a control target temperature for the coolant oil is less than a specified value. This step is carried out to protect the main machine (1) from damage and accuracy abnormality due to residual heat. If the decision is NO, then the signal processing operation returns straight to STEP S1. If STEP S16 makes a decision of YES, the signal processing operation proceeds to STEP S17. In STEP S17 it is decided whether the inverter (28) is in operation. Here, if the decision is NO (i.e., the inverter (28) is out of operation), then the signal processing operation proceeds straight to STEP S19. On the other hand, if the decision is YES (i.e., the inverter (28) is in operation), then the signal processing operation first proceeds to STEP S18 in which a stop command is issued to the inverter (28), and thereafter the signal processing operation proceeds to STEP S19. In STEP S19 the circuit between the inverter (28) and the compressor (15) is disconnected by switching of the second type relay (31) associated with the compressor (15). In STEP S20 the circuit between the commercial power supply and the oil pump (12) is disconnected by switching of the first type relay (30) associated with the oil pump (12). Next, in STEP S21 the circuit between the inverter (28) and the oil pump (12) is connected by switching of the second type relay (31) associated with the oil pump (12). Then, the signal processing operation proceeds to STEP S22. In STEP S22 contents of a variable flow rate operation mode stored in the variable flow rate mode operation contents storage part (35) are read. In STEP S23 the contents thus read are transferred to the command value arithmetic part (34). In STEP S24 an operation command is issued to the inverter (28) and thereafter the signal processing operation proceeds to STEP S11.

In accordance with the present embodiment, a combination of mode selecting ON and OFF signals sent from the main control unit (5) on the side of the machine tool (1) is detected as an operating state or operating environmental state of the machine tool (1) in STEPS S1 and S2.

Further, the amount of coolant oil that the oil pump 12 circulates is made variable on the basis of the combination of mode selecting ON and OFF signals sent from the main control unit (5) (the operating state or operating environmental state of the machine tool (1)) in STEPS S21–S24.

Accordingly, in the present embodiment, during normal operation (for example, when the machine tool (1) is in operation), a combination of mode selecting ON and OFF signals, delivered from the main control unit (5) on the side of the machine tool (1) to the temperature control part (27) of the control unit (26) on the side of the oil conditioner (7), is a combination indicative of a rated flow rate mode (both the mode selecting signals are in the OFF state as exemplarily shown in the Table). The pump motor (11) of the oil pump (12) in the oil conditioner (7) is connected to the commercial power supply, whereby the oil pump (12) is operated in the rated flow rate mode, and the coolant oil is forcefully circulated between the coolant oil circulation circuit (8), the oil piping (3) of the machine tool (1), and the reservoir (4) of the machine tool (1). Meanwhile, the inverter (28) is connected to the compressor (15), and the operating frequency of the compressor (15) is controlled by the inverter (28). Gas refrigerant is compressed by the compressor (15). The gas refrigerant compressed is cooled and is condensation liquefied in the condenser (16). This liquid refrigerant is depressurized in the capillary tube (17) and thereafter is evaporated in the evaporator (18). The coolant oil in the coolant oil circulation circuit (8) is cooled by heat exchange with the refrigerant in the evaporator (18). To sum up, the coolant oil, which has returned to the inside of the reservoir (4) from the main spindle part (2) of the machine tool (1) by way of the oil piping (3), is drawn into the oil pump (12) from the reservoir (4) via the inlet port (9) of the oil conditioner (7) and is discharged therefrom. The coolant oil discharged from the oil pump (12) is cooled in the evaporator (18) and thereafter is supplied again to the main spindle part (2) of the machine tool (1) from the coolant oil circulation circuit (8) via the outlet port (10), whereby thermal load generated in the main spindle part (2) is absorbed and its temperature is held constant.

On the other hand, for example when the machine tool (1) is out of operation, it enters the state in which its heat generation amount is reduced. Therefore there is no need to supply to the machine tool (1) cooled coolant oil at a rated flow rate. It is sufficient for the machine tool (1) to be supplied with a minimum amount of coolant oil. At this time, a combination of ON and OFF signals from the main control unit (5) indicates a variable flow rate mode, and the first and second type relays (30) and (31) connected to the compressor (15) and the first and second type relays (30) and (31) connected to the oil pump (12) are switched. And the circuit between the inverter (28) and the compressor (15) is disconnected, as a result of which the operation of the compressor (15) is brought into a halt. Further, the circuit between the oil pump (12) and the commercial power supply is disconnected and the circuit between the inverter (28) and the oil pump (12) is connected. Because of this, the oil pump (12) is operated in the variable flow rate mode, and a minimum required amount of coolant oil is forcefully circulated between the coolant oil circulation circuit (8), the oil piping (3) of the machine tool (1), and the reservoir (4) of the machine tool (1). As described above, the oil pump (12) is caused to operate in variable flow rate mode, thereby making it possible to reduce the amount of coolant oil that the oil pump (12) circulates. This reduces unnecessary energy consumption by the oil pump (12) and achieves energy savings.

Further, the output of the single inverter (28) is switchably connected to the compressor (15) or to the oil pump (12), thereby making it possible to effectively utilize the idle inverter (28) when the compressor (15) stops operating, for the operation of the oil pump (12). In comparison with a case (such as a second exemplary embodiment which will be described later) in which two inverters are connected to the compressor (15) and to the oil pump (12), respectively, it is possible to cut costs by reducing the number of inverters (28) required. Further, it is possible to reduce power loss for inverter efficiency when the oil pump (12) is operated in normal mode by the output of the inverter (28) in the same way as using the commercial power supply.

In the aforementioned description, the destination, to which the output from the inverter (28) is directed, is switched between the compressor (15) and the oil pump (12). Alternatively, the inverter output destination may be switched between the compressor (15) and the heater (24). That is, FIG. 7 shows an arrangement of the temperature control part (27) of the control unit (26) when the destination, to which the output from the inverter (28) is directed, is switched between the compressor (15) and the heater (24). The temperature control part (27) comprises a mode switching decision part (33) for issuing a switching command to the first and second type relays (30) and (31) of the inverter switching circuit (29) which are associated with the compressor (15) and to the first and second type relays (30) and (31) of the inverter switching circuit (29) which are associated with the heater (24), and a temperature control arithmetic part (41) for performing temperature control arithmetic based on the control object temperature and on the temperature target value and for outputting a frequency corresponding to the arithmetic result to the inverter (28). The control object temperature is any one of a main temperature detected by the main temperature thermistor (TH1), an outlet oil temperature detected by the outlet oil temperature thermistor (TH2), and an inlet oil temperature detected by the inlet oil temperature thermistor (TH4) or a difference between any two of temperatures including these three temperatures and an air temperature detected by the air temperature thermistor (TH3).

Figure 3:
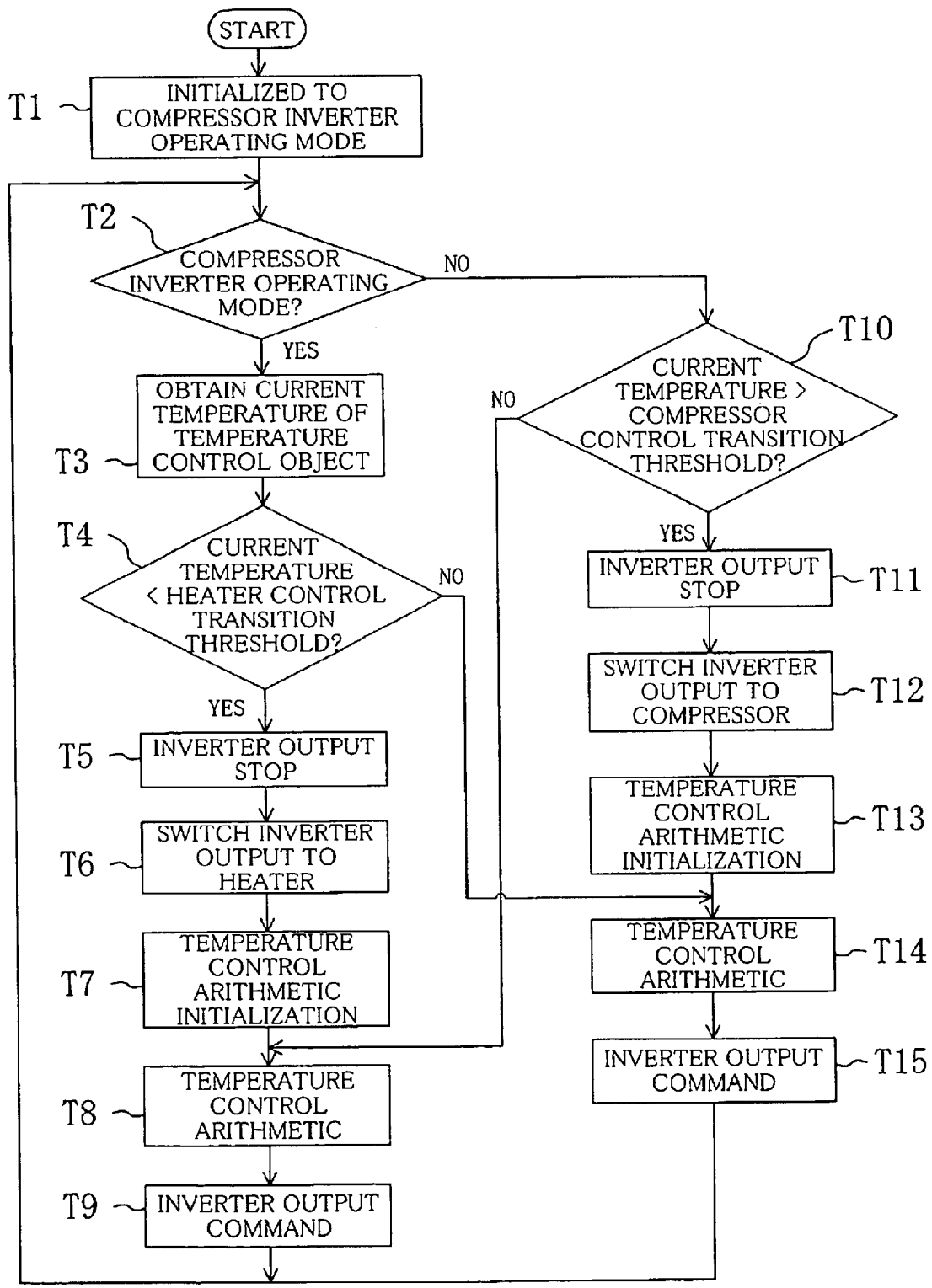
FIG. 3 is a flow chart diagram showing a signal processing operation to switch the destination, to which the output from the inverter is directed, between a compressor and a heater in a control unit.

Referring to FIG. 3, a signal processing operation for switching the destination, to which the output from the inverter (28) is directed, between the compressor (15) and the heater (24) will be described. Firstly, in STEP T1 after START, the operating mode is initialized to a compressor inverter operating mode in which the compressor (15) is operated and controlled by the inverter (28). Next, in STEP T2 it is decided whether the compressor inverter operating mode is currently being performed. If the decision is YES, then the signal processing operation proceeds to STEP T3. In STEP T3 a current temperature of the temperature control object is obtained. Next, in STEP T4 it is decided whether the current temperature obtained in STEP T3 is lower than a heater control transition threshold (<target temperature). If the decision is NO, then the signal processing operation proceeds to STEP T14 which will be described later. On the other hand, if the decision is YES, the signal processing operation makes a transition to a heater inverter operating mode of STEPS T5–T9. That is, in STEP T5 the inverter (28) stops outputting to the compressor (15). Next, in STEP T6 the output of the inverter (28) is switched to the heater (24). Further, in STEP T7 arithmetic in the temperature control arithmetic part (41) is initialized. In STEP T8 temperature control arithmetic is performed. Finally, in STEP T9 an output command is issued to the inverter (28), after which the signal processing operation returns to STEP T2.

On the other hand, if STEP T2 makes a decision of NO, then the signal processing operation proceeds to STEP T10. In STEP T10 it is decided whether a current temperature is higher than a compressor control transition threshold (>target temperature). If the decision is NO, then the signal processing operation proceeds to STEP T8. On the other hand, if the decision is YES, then the signal processing operation is caused to make a transition to a compressor inverter operating mode of STEPS T11–T15. Firstly, in STEP T11 the inverter (28) stops outputting to the heater (24). Next, in STEP T12 the output of the inverter (28) is switched to the compressor (15). Further, in STEP T13 arithmetic in the temperature control arithmetic part (41) is initialized. In STEP T14 temperature control arithmetic is performed. Finally, in STEP T15 an output command is issued to the inverter (28) and thereafter the signal processing operation returns to STEP T2.

Figure 8:
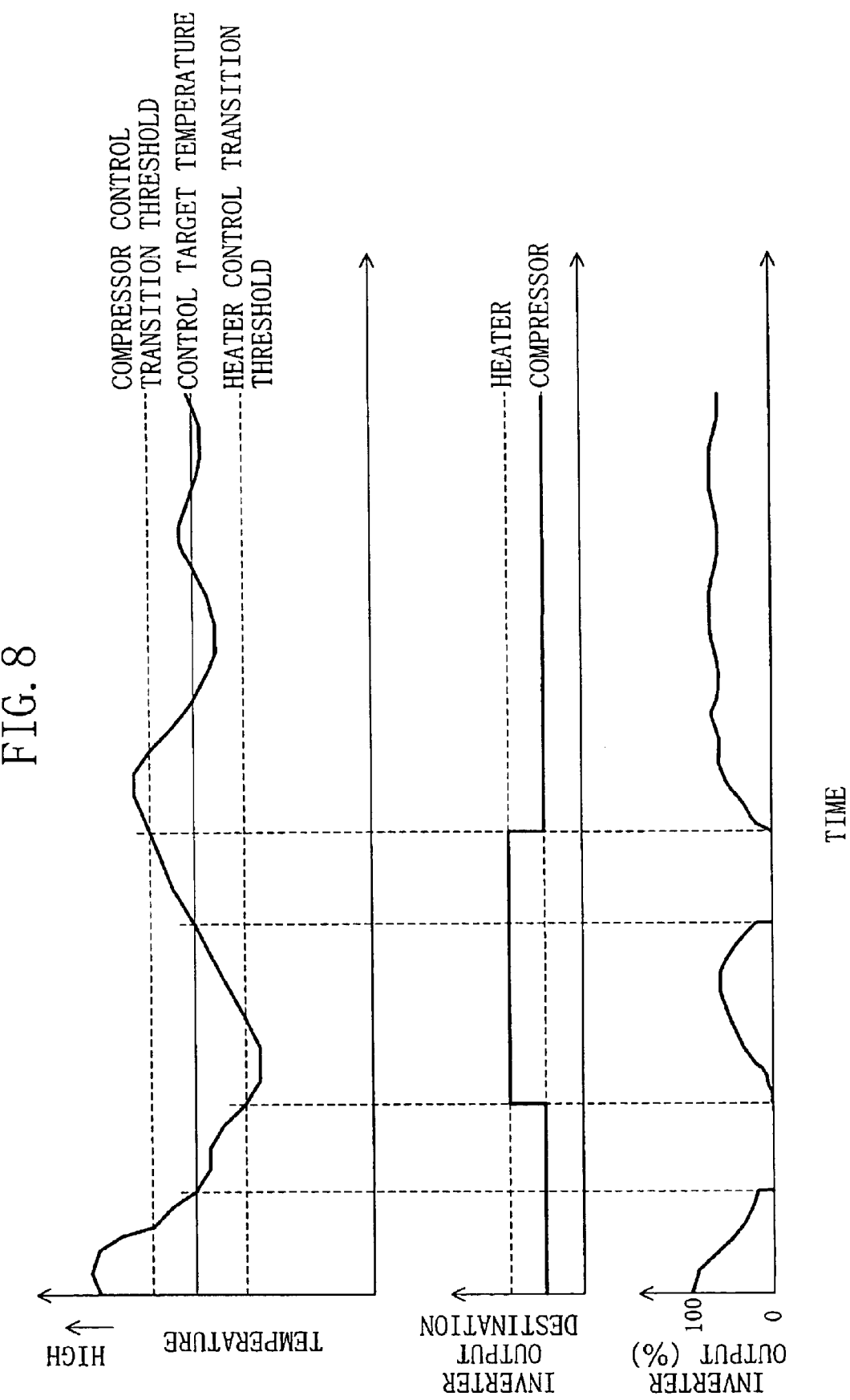
FIG. 8 is a timing chart diagram showing variations in the temperature as well as in the inverter output, when switching the inverter output destination between the compressor and the heater.
Figure 9:
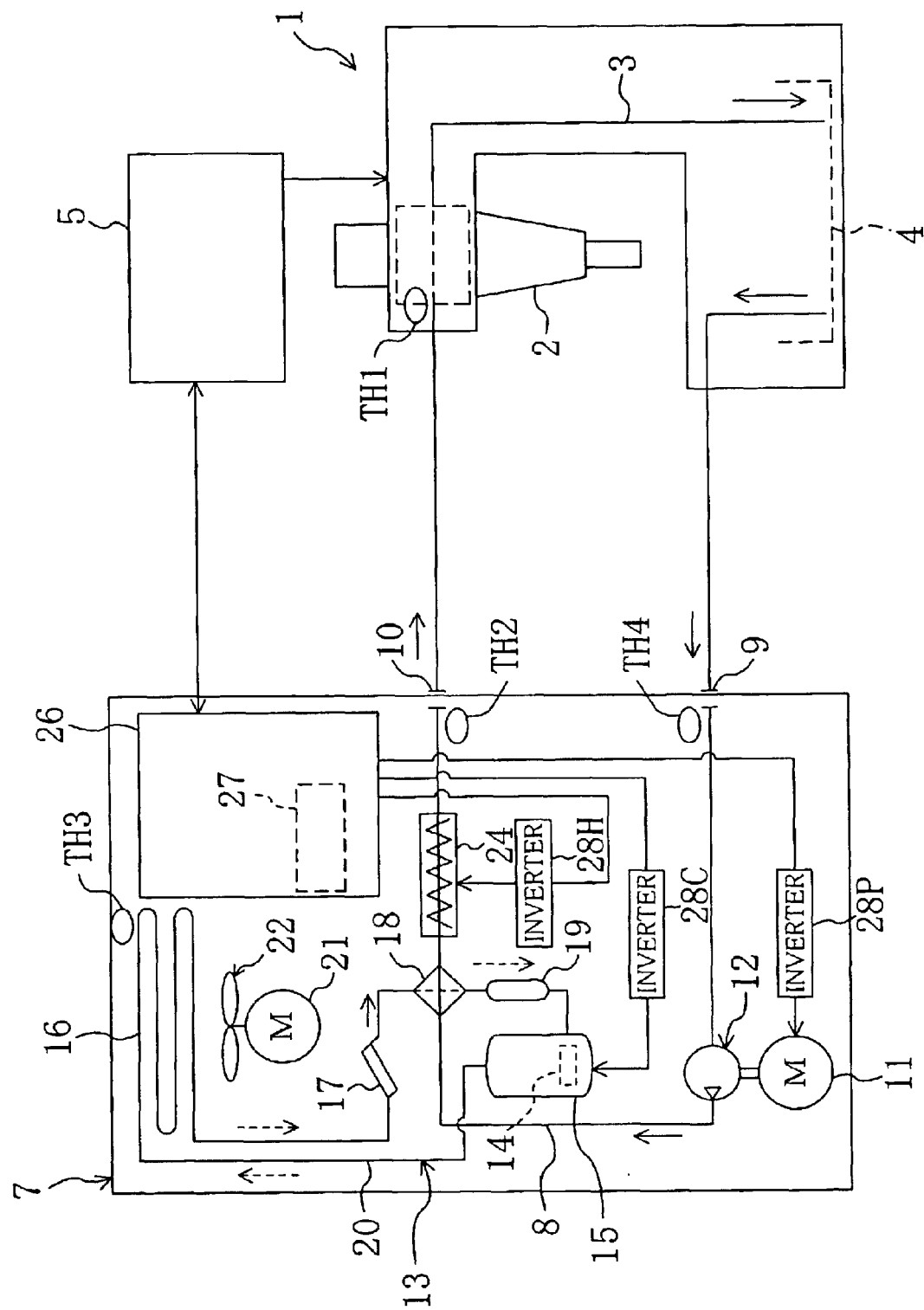
FIG. 9 is a corresponding diagram to FIG. 4 showing a second exemplary embodiment of the present invention.

Accordingly, in this exemplary case, when a current temperature of the temperature control object (any one of a main temperature, an outlet oil temperature, and an inlet oil temperature or a difference between any two of temperatures including these three temperatures and an air temperature) is higher than the compressor control transition threshold, the output of the inverter (28) is connected to the compressor (15) and a compressor inverter operating mode, in which the compressor (15) is operated and controlled by the inverter (28), is carried out (see FIG. 8).

On the other hand, if the current temperature of the temperature control object is lower than the heater control transition threshold, then the output of the inverter (28) is switched to the heater (24), whereby a heater inverter operating mode, in which the heater (24) is controlled by the inverter (28), is performed. Making use of the output of the inverter (28) for the heater (24) makes it possible to provide improved temperature control performance in comparison with a case in which the heater (24) is ON/OFF controlled.

In each of the foregoing examples, the output of the inverter (28) is switchably connected to the compressor (15), to the oil pump (12), or to the heater (24). Alternatively, the output of the inverter (28) may be switchably connected to the compressor (15) or to the electric fan (22).

Embodiment 2

Referring now to FIG. 2, there is shown a second exemplary embodiment of the present invention. Note that the same reference numerals are used in each of the following exemplary embodiments of the present invention to denote components which correspond to those in FIGS. 1–8 and they are not described here in detail. In the first exemplary embodiment described above, it is arranged such that the single inverter (28) is switchably connected to the compressor (15), to the oil pump (12), or to the heater (24) (or the air blowing fan (22)). On the other hand, in the second exemplary embodiment it is arranged such that the compressor (15), the oil pump (12), and the heater (24) are connected to their own inverters, respectively.

Stated another way, in the present embodiment a compressor inverter (28C) is connected to the compressor motor (14) of the compressor (15), a pump inverter (28P) is connected to the pump motor (11) of the oil pump (12), and a heater inverter (28H) is connected to the heater (24). These inverters (28C), (28P), and (28H) are controlled by the temperature control part (27) of the control unit (26). Each inverter (28C), (28P), and (28H) is controlled in the same way as in the first exemplary embodiment in which the single inverter (28) is provided.

Accordingly, in the present exemplary embodiment the operating frequency of the compressor (15) of the cooling device (13) is controlled by the compressor inverter (28C). Further, the oil pump (12) in the coolant oil circulation circuit (8) of the oil conditioner (7) is controlled by the pump inverter (28P), and the main control unit (5) provides a combination of mode selecting ON and OFF signals indicative of a variable flow rate mode, when the machine tool (1) enters for example the out-of-operating state and, as a result, the amount of heat produced in the operation of the machine tool (1) is reduced (i.e., when there is no need to deliver to the machine tool (1) cooled coolant oil at a rated flow rate and it is sufficient that a minimum required amount of coolant oil for lubrication or the like is delivered to the machine tool (1)), and the oil pump (12) is operated in the variable flow rate mode by the pump inverter (28P). As a result, the amount of coolant oil that the oil pump (12) circulates is controlled so as to be reduced. This therefore restrains unnecessary energy consumption, thereby saving energy.

Further, the heater (24) is controlled by the heater inverter (28H), which provides improvement in temperature control performance.

Embodiment 3

Figure 10:
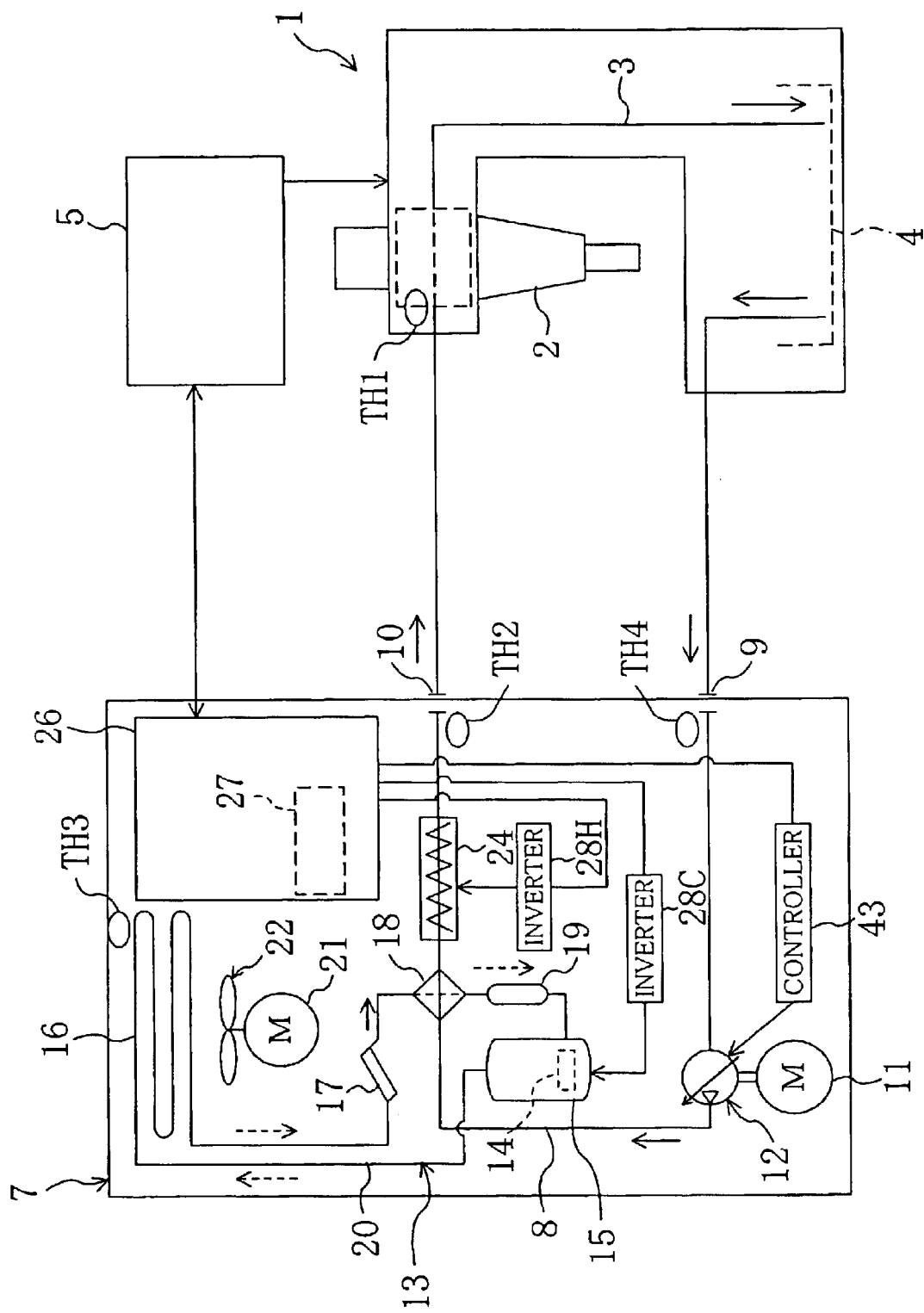
FIG. 10 is a corresponding diagram to FIG. 4 showing a third exemplary embodiment of the present invention.

Referring now to FIG. 10, there is shown a third exemplary embodiment of the present invention. In the second exemplary embodiment the pump motor (11) of the oil pump (12) is controlled by the inverter (28P). On the other hand, the present embodiment employs the oil pump (12) of a variable displacement type.

That is, in the present embodiment the oil pump (12) is implemented by for example a swash plate type variable displacement pump capable of discharging coolant oil at variable amounts and only the commercial power supply is applied to the pump motor (11) of the pump (12). Further, a controller (43) is provided which makes a change in the swash plate angle (or in the pump flow rate), and the temperature control part (27) of the control unit (26) outputs to the controller (43) a command signal of a swash plate angle (or a pump flow rate) so that the amount of coolant oil that the oil pump (12) circulates is made variable on the basis of the combination of mode selection signals from the main control unit (5) of the machine tool (1) (the operating state or operating environmental state of the machine tool (1)). The other configurations of the present embodiment are the same as those described in the second exemplary embodiment and therefore the same effects as achieved in the second exemplary embodiment can be obtained.

An arrangement may be made in which the oil pump (12) (which is a swash plate type variable displacement pump) of the third exemplary embodiment is replaced by the oil pump (12) of an ordinary type described in the first exemplary embodiment and a pole change circuit for increasing or decreasing the number of poles of the pump motor (11) is provided so that the flow rate of coolant oil can be made variable by controlling the number of poles of the pump motor (11) by the pole change circuit. This arrangement can provide the same effects as described above.

Further, in each of the foregoing exemplary embodiments the oil conditioner (7) for controlling the temperature of coolant oil of the machine tool (1) comprising a machining center has been described. However, other than that application, the present invention is applicable also to the controlling of the temperature of coolant oil of machine tools such as NC lathe, grinder, NC special machine, industrial machines such as molding machine, press machine, and other various devices.

INDUSTRIAL APPLICABILITY

In a system in which a coolant liquid for a device is circulated by a circulation pump, the temperature of the device coolant liquid is held at a substantially constant value by heat exchange with refrigerant in a refrigeration circuit, and the operating frequency of a motor of a compressor in the refrigeration circuit is controlled by an inverter, the present invention makes it possible to reduce the amount of coolant liquid that the circulation pump circulates at the time when the amount of heat produced in the operation of the device decreases, and to make use of the inverter without having to stop it. Therefore, the present invention is superior in industrial applicability because it is possible to promote not only energy savings by the circulation pump but also effective utilization of the inverter.

What is claimed is:

1. A temperature controller for a liquid cooling system, said liquid cooling system comprising:

a coolant liquid circulation circuit (8) in which a coolant liquid of a machine (1) is circulated by a circulation pump (12) which is operated by a motor (11), a refrigeration circuit (20) formed by interconnecting, in the order given, a compressor (15), operated by a motor (14), for compressing gas refrigerant, a condenser (16) for condensing gas refrigerant, a pressure reducing mechanism (17) for depressurizing liquid refrigerant, and an evaporator (18) for cooling said coolant liquid in said coolant liquid circulation circuit (8) by heat exchange with refrigerant, an inverter (28, 28P) which changes the operating frequency of said motor (11) of said circulation pump (12), an the operating frequency of said motor of said compressor; and switching means (33) which switches, according to an operating state or operating environmental state of said machine (1), the destination, to which an output from said inverter (28) is directed, between said motor (14) of said compressor (15) and said motor (11) of said circulation pump (12);

wherein coolant liquid circulation amount control means (27) is provided which varies, on the basis of an operating state or operating environmental state of said machine (1), the amount of coolant liquid that said circulation pump (12) circulates and said coolant liquid circulation amount control means (27) varies the rate of flow by controlling the operating frequency of said motor (11) of said circulation pump through said inverter (28, 28P).

2. The temperature controller for said liquid cooling system of claim 1, wherein:
said coolant liquid circulation amount control means (27) has, as the operating mode of said circulation pump (12), a rated flow rate mode in which the rate of flow of said coolant liquid is fixed and a variable flow rate mode in which the rate of flow of said coolant liquid varies, and is so configured as to allow said circulation pump (12) to switch between said flow rate modes according to an operating state or operating environmental state of said machine (1).

3. The temperature controller for said liquid cooling system of any one of claims 1 and 2, wherein said operating state or operating environmental state of said machine (1) includes at least one of a signal sent from the side of said machine (1), a liquid temperature of said coolant liquid, an operating temperature of said machine (1), and an environmental temperature of said machine (1).

4. The temperature controller of any one of claims 1 and 2, wherein said machine (1) is a machine tool or industrial machine using oil as a coolant liquid.

* * * * *

UNITED STATES PATENT AND TRADEMARK OFFICE
CERTIFICATE OF CORRECTION

PATENT NO.    : 6,779,354 B2
DATED         : August 24, 2004
INVENTOR(S)   : Tetsuo Nakata It is certified that error appears in the above-identified patent and that said Letters Patent is hereby corrected as shown below:

Title page,
Item [54], Title, please delete "TEMPERATURE CONTROL DEVICE OF LIQUID COOLING DEVICE" and insert -- TEMPERATURE CONTROLLER FOR LIQUID COOLING SYSTEM --
Item [30], Foreign Application Priority Data, please delete "11/354133" and insert -- 11-354133 --

Column 14,
Line 35, please delete "an the operating" and insert -- and the operating --

Signed and Sealed this

Twenty-eighth Day of December, 2004

JON W. DUDAS
*Director of the United States Patent and Trademark Office*